United States Patent
Nasir (10) Patent No.: US 11,812,108 B2
(45) Date of Patent: *Nov. 7, 2023

(54) SEARCH AND RECOMMENDATION OF MEDIA ASSETS THROUGH CONVERSATIONAL USE OF CATCHPHRASES

(71) Applicant: Rovi Guides, Inc., San Jose, CA (US)

(72) Inventor: Sahir Nasir, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/244,617

(22) Filed: Apr. 29, 2021

(65) Prior Publication Data

US 2021/0266640 A1   Aug. 26, 2021

Related U.S. Application Data

(63) Continuation of application No. 16/442,717, filed on Jun. 17, 2019, now Pat. No. 11,025,990.

(51) Int. Cl.
| | |
|---|---|
| H04N 21/47 | (2011.01) |
| H04N 21/472 | (2011.01) |
| H04N 21/422 | (2011.01) |
| H04N 21/475 | (2011.01) |
| H04N 21/4788 | (2011.01) |
| H04N 21/482 | (2011.01) |
| H04N 21/81 | (2011.01) |

(52) U.S. Cl.
CPC . *H04N 21/47214* (2013.01); *H04N 21/42203* (2013.01); *H04N 21/4756* (2013.01); *H04N 21/4788* (2013.01); *H04N 21/4826* (2013.01); *H04N 21/8133* (2013.01)

(58) Field of Classification Search
None
See application file for complete search history.

(56) References Cited

U.S. PATENT DOCUMENTS

2021/0377612 A1 * 12/2021 McCarty ............... H04L 51/046

FOREIGN PATENT DOCUMENTS

WO    WO-2019108257 A1 *   6/2019   ......... G06F 16/3344

* cited by examiner

*Primary Examiner* — Cai Y Chen
(74) *Attorney, Agent, or Firm* — HALEY GUILIANO LLP (57) ABSTRACT

During a conversation the participants of the conversation may use catchphrases that are associated with particular characters, media assets, or media personalities. The catchphrases may be associated with information such as the media asset where the catchphrase was originally spoken, the speaker, and keywords relating to the media asset. Based on this associated information and the participant's use of the catchphrase, the system may provide a media asset recommendation to the participant for a media asset that does not include the catchphrase.

20 Claims, 7 Drawing Sheets

FIG. 1

| Catch Phrase | User | Media Asset | Character | Actor | Genre | Keywords |
|---|---|---|---|---|---|---|
| "Turrible" | User 1 | NBA on TNT | N/A | Charles Barkley | Sports | Sir Charles, Chuck, basketball, Auburn, 76ers, humorous, Spike Lee, Samuel L. Jackson, Shaq, ... |
| "Yeah well that's just like your opinion man" | User 2 | The Big Lebowski | Jeffrey Lebowski | Jeff Bridges | Comedy | Dark comedy, cult classic, slacker, bowling, Steve Buscemi, John Goodman, Coen brothers, ... |
| "Don't be fatuous Jeffrey" | User 1 | The Big Lebowski | Maude Lebowski | Julianne Moore | Comedy | Dark comedy, cult classic, artist, heiress, quirky characters, Coen brothers, Los Angeles, ... |
| "revenge is a dish best served cold" | User 1 | The Godfather | Don Corleone | Marlon Brando | Drama | Mafia, period piece, violent movies, Robert De Niro, Francis Ford Coppola, New York, Sicily, ... |

SEARCH AND RECOMMENDATION OF MEDIA ASSETS THROUGH CONVERSATIONAL USE OF CATCHPHRASES

CROSS-REFERENCE TO RELATED APPLICATION

This application is a continuation of U.S. patent application Ser. No. 16/442,717, filed Jun. 17, 2019, which is hereby incorporated by reference herein in its entirety.

BACKGROUND

The present disclosure is directed to systems for analyzing conversational speech to support media asset searches and recommendations.

SUMMARY

Media services are proliferating with the advent of streaming and over-the-top (OTT) technologies. Whereas a consumer of media content may have previously accessed media through a relatively small number of media sources such as one of cable or satellite and perhaps a single streaming service, as interactive technology developed, these media sources had access to exhaustive information relating their customers' viewing habits and interests from sources such as viewing history and user profiles. As the media environment becomes increasingly fragmented, a typical consumer may access media assets from numerous subscription, advertisement-supported, and/or hybrid services. Each of these services is competing for the user's attention for views that can be sold to advertisers or to justify recurring subscription revenue. At the same time, barriers to the creation and distribution of media assets have been reduced significantly, such that there is a proliferation of content that is available to a viewer to such a degree that the user cannot ever view or peruse all of the content, even within genres of particular interest. As a result, there is a dilemma for the viewer of too many choices both as to services and within services. In a fragmented media environment with virtually unlimited choice, particular media services lack the systems and data sources to provide search results and recommendations that keep a user engaged with a particular service and that identify media assets within the service that are of interest to the viewer.

In some embodiments of the present disclosure, data regarding user conversations may be obtained, for example, based on a user opt-in to conversation-based recommendations. User conversations may take place on a variety of platforms, and catchphrases may be identified from the user conversations. As used herein, "catchphrases" may refer to words, phrases, pronunciations, affectations, and other related usages that are uniquely identified with an individual who appears in media assets, such as a character, actor, celebrity, or online personality. The catchphrases may be identified from the media assets from raw data, or may be provided by third parties that process the raw data (e.g., that match catchphrases, processes, or APIs provided by a provider of the search-and-recommendation service). For example, portions of the conversation (e.g., text or speech) may be compared to a set of known catchphrases, or in some embodiments, potential new catchphrases that have been identified based on recent spikes in usage in conversation about particular media assets.

The utterance of the catchphrase may be associated with a user. For example, the opted-in user's conversations may be analyzed to identify catchphrases as described herein. In some embodiments, only speech by the particular user may be analyzed, for example, if another participant in the conversation has not opted in to conversational analysis. When usage of a catchphrase is identified for a particular user or in a conversation involving the user, the use of the catchphrase by the user may be stored in a data structure (e.g., a database), for example, that is organized based on user and/or catchphrase.

The usage of the catchphrase by the user may be indicative not only that the user has viewed a particular media asset but also that the user has a strong affinity for a particular character, actor, genre, atmosphere, director, or other secondary information that is related to the catchphrase. In some embodiments, associations between a catchphrase and a variety of such secondary information may be maintained and accessible for lookup and comparison to similar information associated with other catchphrases. A user's utterance of different catchphrases in conversation, when analyzed with these associations, may reveal complex patterns about a user's preferences for media assets that are otherwise not available from user viewing history. In this manner, analysis of the user's catchphrase usage (and in some embodiments, those of other participants in the user's conversations who have given authorization) can provide predictive information about the user's true interests that is superior to viewing history and profile metrics alone, which are heavily influenced by previous recommendations or viewing interests of others.

The user's catchphrase usage may thus be used to recommend other media assets that do not include the catchphrase, based on the associations of the catchphrase with other media asset information. In some embodiments, a catchphrase history may be considered to weight the use of media asset information associated with catchphrases based on factors such as recent usage and frequency of usage. The media asset information associated with the catchphrase may also be considered with other information, such as user preferences and viewing history. With appropriate opt-ins, catchphrase usage by other conversation participants or by acquaintances in other conversations (e.g., as determined from a social media platform) may be considered in formulating recommendations and search results. The resulting recommendations and search results derived from catchphrase usage and data structures may thus be more accurate than standard recommendations and search results, and require less processing and storage than conventional systems that require extensive training data and/or analytics to derive a user's unexpressed and latent interests and preferences.

Once a user has opted-in to analysis of conversational data, and based on the user's particular opt-in options, conversations of the user for analysis may derive from a variety of sources such as text messages, stand-alone messaging applications, messaging applications of specific programs (e.g., gaming or social media), phone or video chat conversations, or casual conversations captured by passive listening devices such as personal assistants. A user may be provided a detailed set of options as to sources of conversation that will be analyzed. In some embodiments, the analysis system may process the conversations for catchphrases and permanently delete the underlying conversation, such that the only information that is retained is an indicator that the user uttered a particular catchphrase and a limited subset of information about that utterance as approved by the user (e.g., time of day, user tone, favorable or unfavorable utterance, other participants in the conversation, location, activity, etc.). In this manner, extremely useful information about the user's unexpressed and latent interests may be obtained with minimal sacrifice of user privacy.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

As the number of media sources and available media assets increase, it becomes increasingly difficult for a consumer to identify particular media assets of interest. Thus, consumers are increasingly relying on search-and-recommendation functionality to identify media assets that are of particular interest to them. In the embodiments of the present disclosure, searches and recommendations are based on a user's conversational use of catchphrases. The user may engage in a conversation such as in a messaging application or in proximity to a personal assistant device. User conversations (e.g., text and/or processed speech) may be analyzed to identify use of catchphrases during the conversation.

Information about catchphrases may be stored in data structures such as a catchphrase database. For example, data structures may associate catchphrases with the media assets where the catchphrase was spoken as well as the characters or personalities that spoke the catchphrase. Additional information about the catchphrase may include a variety of descriptive information or relationships, such as genres, moods, directors, other actors or characters who appear when the catchphrase is spoken, time period depicted, location, theme of scenes, etc. In this manner, each catchphrase and its associated data (e.g., a catchphrase data structure) provide a wealth of interrelated data that reveals unique relationships and characteristics for the catchphrase.

A user's utilization of catchphrases may be monitored, including over an extended time period. A user's catchphrase history may then be used to provide media asset search results and recommendations. For example, a user may have a number of catchphrases that are used frequently in conversation, some that are used occasionally in conversation, and some where usage spikes and falls in correlation with cultural trends. Catchphrase information may be cross-referenced between the user's catchphrases, and matching results may be weighted based on frequency of use, recency of use, etc. The resulting compiled user-specific catchphrase data may then be compared to information about media assets that are available for viewing by the user, and in some embodiments, filtered by other information such as user search queries, available applications, etc. A customized recommendation or search result may be delivered to the user based at least in part on their catchphrase history and the underlying associations between catchphrases and other media assets.

Figure 1:
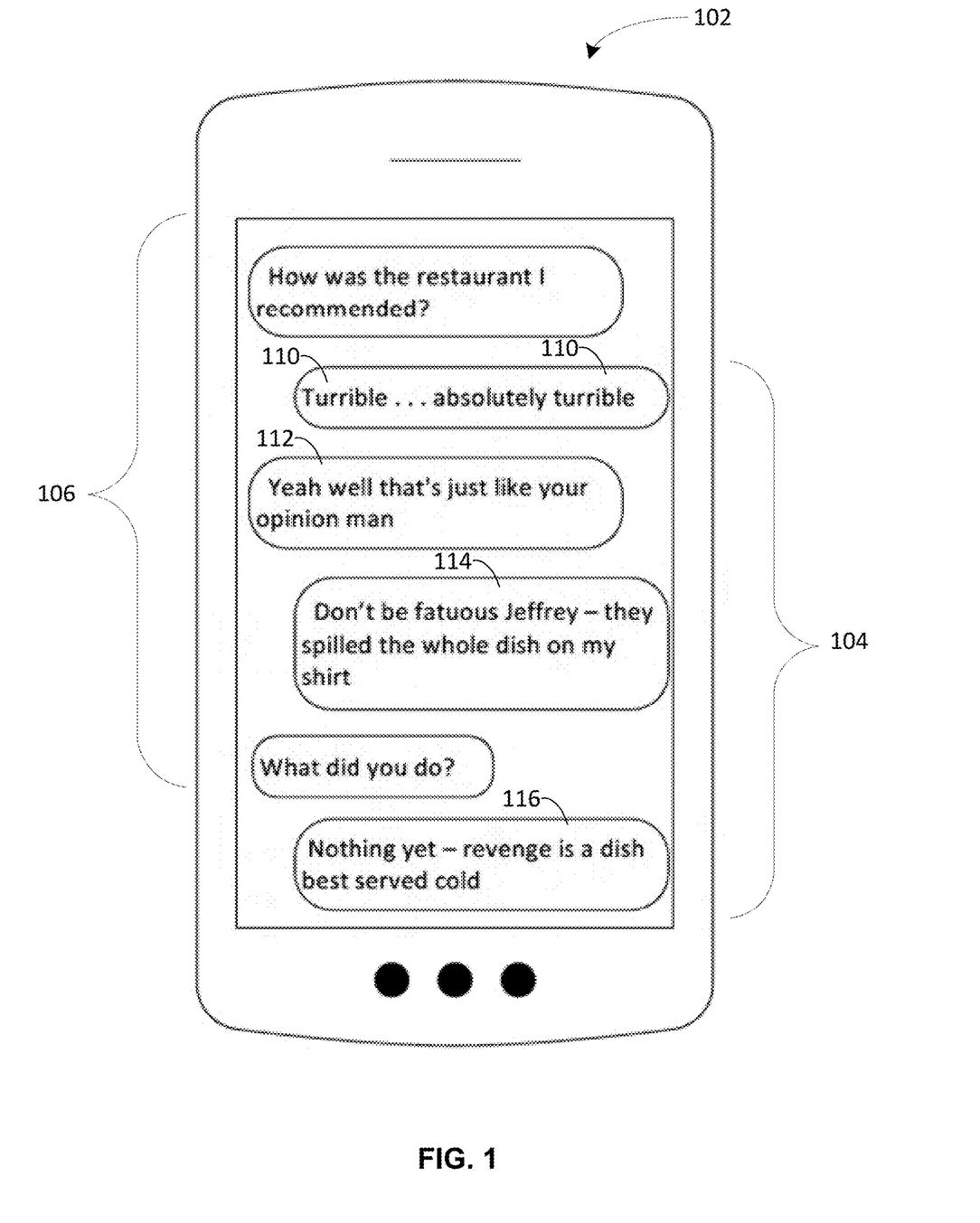
FIG. 1 shows an illustrative embodiment of a plurality of users using catchphrases in conversation, in accordance with some embodiments of the disclosure.

FIG. 1 shows an illustrative embodiment of a plurality of users using catchphrases in conversation, in accordance with some embodiments of the disclosure. Although a particular conversation having two participants is shown in the embodiment of FIG. 1, in some embodiments, conversations may include group conversations or any other situation where two or more participants are engaging with each other, such as social media postings that have a conversational aspect or "conversations" of a participant with a personal assistant device. In the exemplary embodiment of FIG. 1, a two-participant conversation is taking place via a messaging application on a smartphone 102, although it will be understood that conversations may take place on a variety of suitable user devices as described herein, as well as on a variety of applications such as personal assistants, media guidance, text messaging, social media with public or group postings, video-conferences, video streams or recordings, personal or vehicle navigation, or any other suitable application that provides an opportunity for a participant to engage with other participants or a conversational electronic participant (e.g., a chatbot or personal assistant).

In the exemplary embodiment of FIG. 1, two participants 104 and 106 engage in a conversation about a restaurant recommendation given by the first participant 104 to the second participant 106. In the embodiment of FIG. 1, the conversation is not related to a direct request from either participant to access or view a media asset, although in some embodiments the conversation may directly relate to a media asset (e.g., between two or more users about which media assets to watch, or between a user and voice or text interface with a media guidance application). A first portion of the conversation (e.g., right-side portion) may be associated with the first participant 104 and a second portion of the conversation (e.g., left-side portion) may be associated with the second participant 106. In some embodiments of the present disclosure, a user may provide permission for a media guidance application to access conversations within the application itself and/or from other applications. The permissions may dictate exactly what applications will be considered for purposes of identifying catchphrase usage. In some embodiments, users may also opt to have their catchphrase usage considered in providing recommendations to other users, which permission may include permission to associate the catchphrase with the speaker or to associate the catchphrase only generically with the conversation that the user receiving the recommendation participated in. In instances where some or all of the conversation takes place at a public or partially public electronic forum or location, sharing of catchphrase usage information from multiple conversation participants may be implemented in a manner consistent with the privacy of the forum or location.

In some embodiments, the conversation may be analyzed directly by a system or service that provides the recommendations or search results to the users, for example, where a conversation takes place on a platform that provides media guidance services. In some embodiments, the conversation may be securely transmitted to the media guidance service for direct analysis, with the media guidance service retaining only information that is relevant to media asset recommendations (e.g., user, catchphrase usage, time, location, other participants, application, and other contextual information). In some embodiments, an analysis program may be accessed directly by third-party applications that host conversations (e.g., stored locally at devices and/or third-party servers) that performs the analysis of the conversation to identify catchphrase and contextual information that is relevant to media asset recommendations. Whatever the manner in which the catchphrase and contextual information is gathered from media guidance and other applications, the information may be collected for additional analysis and usage in generating media asset recommendations and search results.

In the embodiment of FIG. 1, the second participant 106 begins the conversation by asking "How was the restaurant I recommended?" The first participant 104 responds with "Terrible . . . absolutely turrible." When processed, this portion of the conversation may be identified as being associated with two instances 110 of a common catchphrase of sports personality Charles Barkley, which is a peculiar pronunciation of the word "terrible." The second participant 106 may respond by saying "Yeah well that's just like your opinion man." When processed, this portion of the conversation may be identified as corresponding to a catchphrase 112 used by slacker character Jeffrey Lebowski, the title character in the cult classic movie "The Big Lebowski." The first participant 104 may respond by saying "Don't be fatuous Jeffrey—they spilled the whole dish on my shirt." When processed, the first portion of this portion of the conversation may be identified as corresponding to a catchphrase 114 of "Don't be fatuous, Jeffrey" which was used by the character Maude Lebowski, the romantic interest of Jeffrey Lebowski in "The Big Lebowski." The second participant 106 may respond by asking "What did you do?" When processed, this portion of the conversation may be identified as not corresponding to any catchphrase, as it is a common usage of the phrase without any particular media guidance context. The first participant 104 may respond by saying "Nothing yet—revenge is a dish best served cold." When processed, the latter portion of the conversation may be identified as corresponding to a catchphrase 114 used by the character Vito Corleone in the movie "The Godfather."

In this manner, four different catchphrases 110-116 may have been identified from the exemplary conversation of FIG. 1. These catchphrases may be associated with data that is available from the application hosting the conversation and or other applications on user devices or remote servers, such that the catchphrase usage is associated with other information that is relevant to media asset recommendations (e.g., user, catchphrase usage, time, location, other participants, application, and other contextual information).

Figure 2:
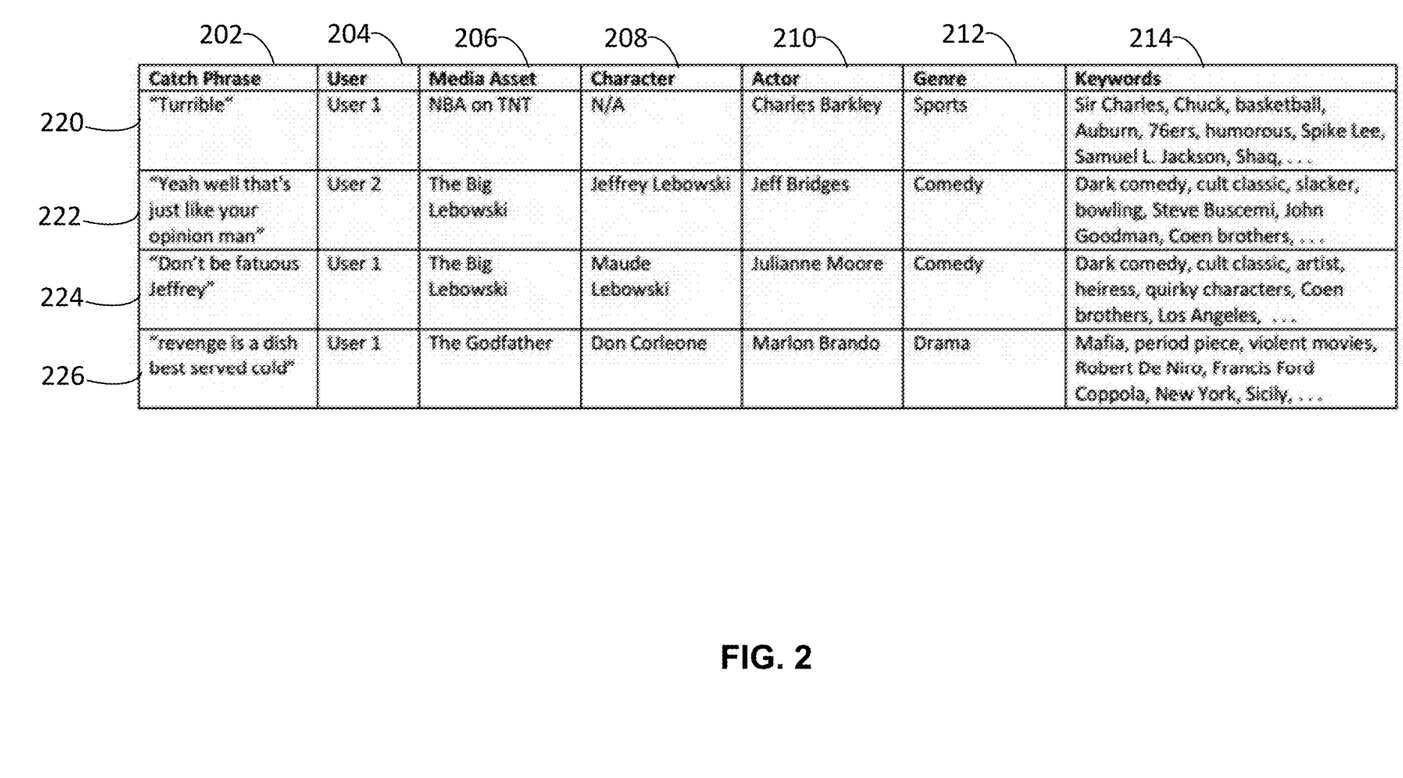
FIG. 2 shows an illustrative embodiment of a data structure associating conversational use of catchphrases with media recommendation and search, in accordance with some embodiments of the disclosure.

FIG. 2 shows an illustrative embodiment of a data structure associating conversational uses of catchphrases with media recommendations and searches, in accordance with some embodiments of the disclosure. Although a particular configuration of fields and subject matters are depicted in FIG. 2, it will be understood that a catchphrase may be associated with a variety of information relevant to media assets. In addition to direct associations of a catchphrase to the media asset where it originated or is used, such as associations to the actor, personality, character, media asset title, genre, related actors, related media assets, director, etc., associations may be drawn between catchphrases that are commonly used by participants in conversations or that tend to evoke responses including catchphrases of related media assets (e.g., signifying a cult-classic type designation).

As depicted in FIG. 2 of the present disclosure, a catchphrase data structure may include a plurality of types of associated information. The exemplary catchphrase data structure of FIG. 2 may correspond to the conversation of FIG. 1, although in some embodiments a provider of media guidance information may maintain records of catchphrase usage by user, conversation, catchphrase, or other media guidance fields and/or other information (e.g., character, actor, genre, media asset, keywords, etc.). Particular subsets of data (e.g., the catchphrase and associated information of FIG. 2, which corresponds to the conversation of FIG. 1) may be combined with similar information from other conversations (e.g., based on overlapping user permissions or multiple conversations from a single user).

As depicted in FIG. 2, a catchphrase data structure may include a number of fields such as "catchphrase," "user," "media asset," "character," "actor," "genre," and "keywords," although a number of other fields and associations may be included as described herein. In the exemplary embodiment of FIG. 2, the catchphrase field 202 may correspond to unique identifiable catchphrases. Although not depicted in FIG. 2, the catchphrase field 202 may include a variety of permutations of a catchphrase or closely related catchphrases as a single catchphrase entry, for example, for catchphrase 220 a variety of permutations such as "terrible," "turrable," "terrable," "terruble," etc. Each of the other fields may similarly include a variety of types of interrelated information, even though for fields 204-212 only a single corresponding entry is provided.

In the exemplary embodiment of FIG. 2, each catchphrase 202 may be associated with a corresponding user 204 that uttered the catchphrase, such as User 1 for catchphrases 220, 224, and 226, and user 2 for catchphrase 222. Although not depicted in FIG. 2, a corresponding weighting may also be provided based on frequency of use, such as the multiple usages of the catchphrase "terrible" by the first participant 104. A media asset 206 field may also be associated with each catchphrase. The media asset field (or a set of related fields) may vary based on the usage of the catchphrase, e.g., whether the catchphrase is used in a single movie or television show, is associated with multiple portions of an entire series, or is stated across multiple media assets, series, or media. In some embodiments, weighting may be provided based on relative usage. In addition, if there are multiple associated media assets, the media asset associated with the particular utterance may be identified or probabilities may be assigned to a likelihood that the utterance was associated with a particular media asset (e.g., based on a context of the conversation, such as related catchphrases, proximity to showings of media assets, etc.).

Each catchphrase 202 may also be associated with characters 208 and actors 210. Although a particular character or actor is depicted in the exemplary embodiment of FIG. 2, multiple characters and/or actors may utter a catchphrase. In some embodiments where a catchphrase is used by multiple characters and/or actors, the particular usage may be associated with a particular character and or actor, or probabilities may be assigned for particular characters or actors. For example, if a catchphrase is commonly used by multiple actors or characters, the system may compare usage of other catchphrases from those characters or actors to better identify the character or actor associated with the particular utterance. Other categories such as genre 212 and keywords 214 can provide additional associations that can be used to draw associations between catchphrases, such as other actors or characters that appear in media assets where the catchphrase is used, mood, location, directors, studios, runtime, date of production, recent showings, etc.

Figure 3:
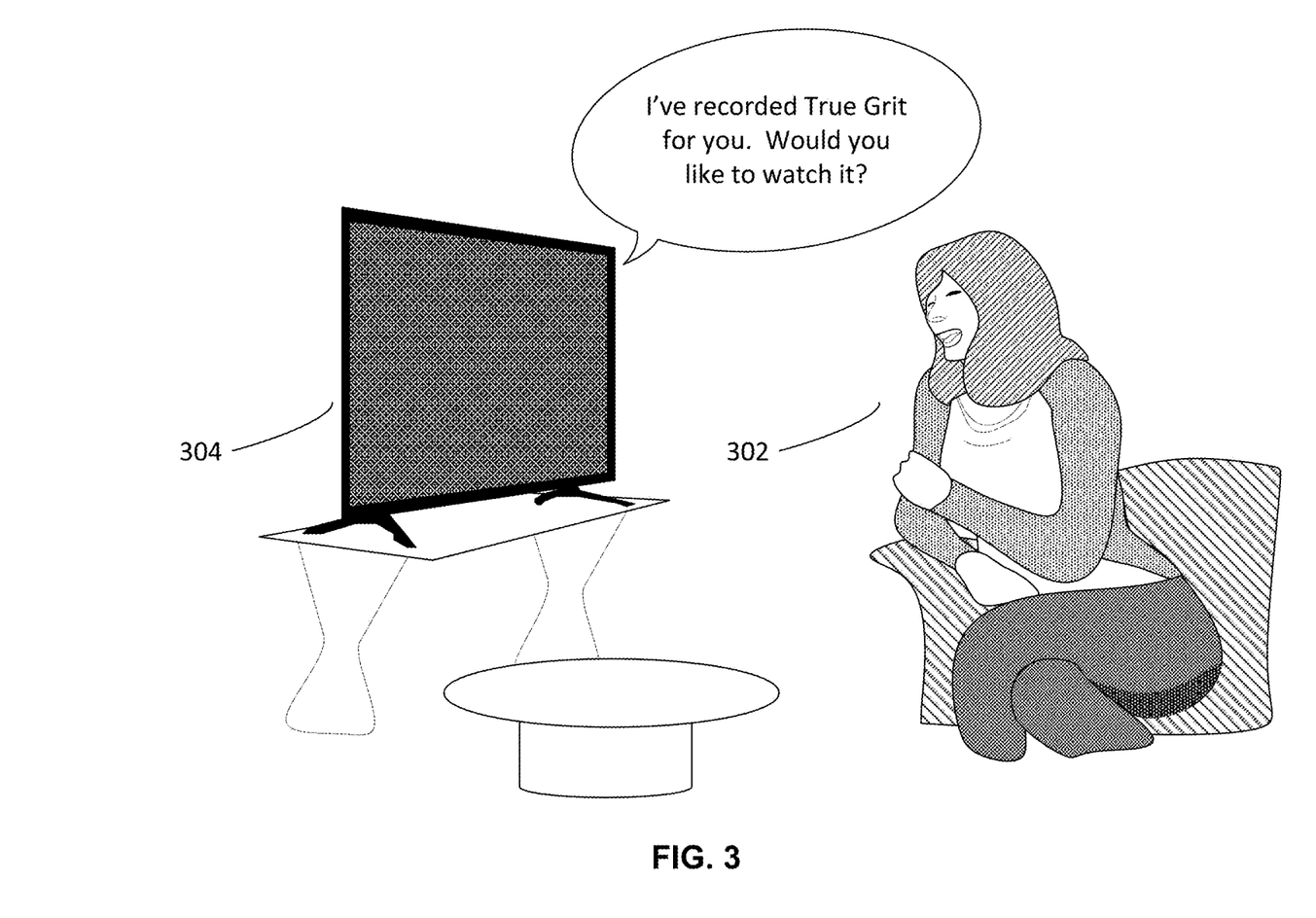
FIG. 3 shows an illustrative embodiment of a recommendation provided to a user based on conversational use of catchphrases, in accordance with some embodiments of the disclosure.

FIG. 3 shows an illustrative embodiment of a recommendation provided to a user based on conversational use of catchphrases, in accordance with some embodiments of the disclosure. In the exemplary embodiment of FIG. 3, a user 302 has performed an action that initiates a media asset recommendation or search, such as requesting a recommendation via voice request or via a remote, entering the room during a time when the user normally views media assets, or engaging in a conversation that indicates a desire to receive a media asset recommendation.

The request may be received by a user device such as a smart television 304, although it will be understood that other suitable devices may receive requests, such as smart phones, wearable devices, personal assistants, and the like. In some embodiments, the device that receives the request may be a different device than the device that provides a response to the request, for example, a personal assistant located in the kitchen may hear a user say "I don't know what I want to watch tonight" and may initiate a search or recommendation process, the result of which may be relayed to the user via a different device such as a television or mobile device. In some embodiments, the request and the response may occur at different times, for example, in the previously discussed example, the request may have come from a kitchen conversation that took place earlier in the day.

Once the request is initiated, it may be processed in order to provide the recommendation or search result. Processing may be performed and allocated at a variety of suitable devices alone or in combination. In some embodiments, processing may occur entirely on a single local device, such as a smart television running a media guidance application. Such an application may receive requests, access locally stored catchphrase data structures and other relevant information (e.g., user profiles, history, and preferences), and provide a result. In some embodiments, such processing may be performed primarily at one or more local or remote servers, with the local device or devices merely initiating requests and providing outputs such as display or audio messages.

The request may be processed based on information stored in a catchphrase data structure as well as additional information such as any content of the request (e.g., "show me a Western"), user profile information, viewing history, and preferences. The association of the user with the catchphrase information may be included in data structures associated with the user, the catchphrase data structure, or both. In an exemplary embodiment, a data structure associated with the user may include a catchphrase data structure, which tracks catchphrase usage (e.g., time/date, frequency, location, and other contextual information) as well as catchphrase associations (e.g., as depicted and described with respect to FIG. 2).

In an exemplary embodiment, based on the conversation of FIG. 1 and data structure illustrated in FIG. 2, a media guidance system may process the request to provide a recommendation. For example, by reviewing the recent conversational usage by the first participant 104 (e.g., the conversation of FIG. 1), it may be determined that the first participant 104 used the catchphrases "terrible" 110, "Don't be fatuous Jeffrey" 114, and "Revenge is a dish best served cold" 116, corresponding to popular catchphrases of the basketball analyst and personality Charles Barkley (i.e., "terrible" 110), character Maude Lebowski from the cult-classic movie "The Big Lebowski" (i.e., "Don't be fatuous Jeffrey" 114), and character Vito Corleone from the popular "Godfather I" movie (i.e., "Revenge is a dish best served cold" 116). In the exemplary embodiment described herein, the second participant 106 may have consented to the utilization of their catchphrase usage to provide recommendations (e.g., at least as to first participant 104), such that the second participant's usage of "Yeah well that's just like your opinion man" 112 is also considered in providing the recommendation to the first participant 104.

In addition to information about the recent conversation 102, the media guidance system may also consider additional information, such as previous catchphrase usage by the user, catchphrase usage by other participants in conversations with the user, user profile information, user viewing history, and user preferences. In the exemplary embodiment of the request of FIG. 3, additional information may include media assets that the user has already watched, and the user may enter the room with a smart television and sit down at a day of the week and time that the user typically watches an entire movie. The information associated with the catchphrase usage in the conversation 102 may be used to identify a media asset recommendation that does not include any of the catchphrases, such as identifying genres and moods based on the user's conversational usage of irreverent phrases such as "terrible" and "Don't be fatuous Jeffrey" (e.g., as determined based on the categories and keywords of FIG. 2). Other catchphrase information may be considered in providing the recommendation, such as the fact that both of participants in the conversation reference phrases from "The Big Lebowski," demonstrating a likely strong preference or recent viewing of that movie. In addition, the use of a catchphrase from "The Godfather," albeit in a joking manner, may indicate a familiarity with and tolerance for relatively more violent content. Accordingly, based on a variety of factors, in the exemplary embodiment of FIG. 3 the media guidance system may select a recommendation of "True Grit," a movie by the directors of "The Big Lebowski" that is somewhat irreverent but has a significant amount of violence.

Figure 4:
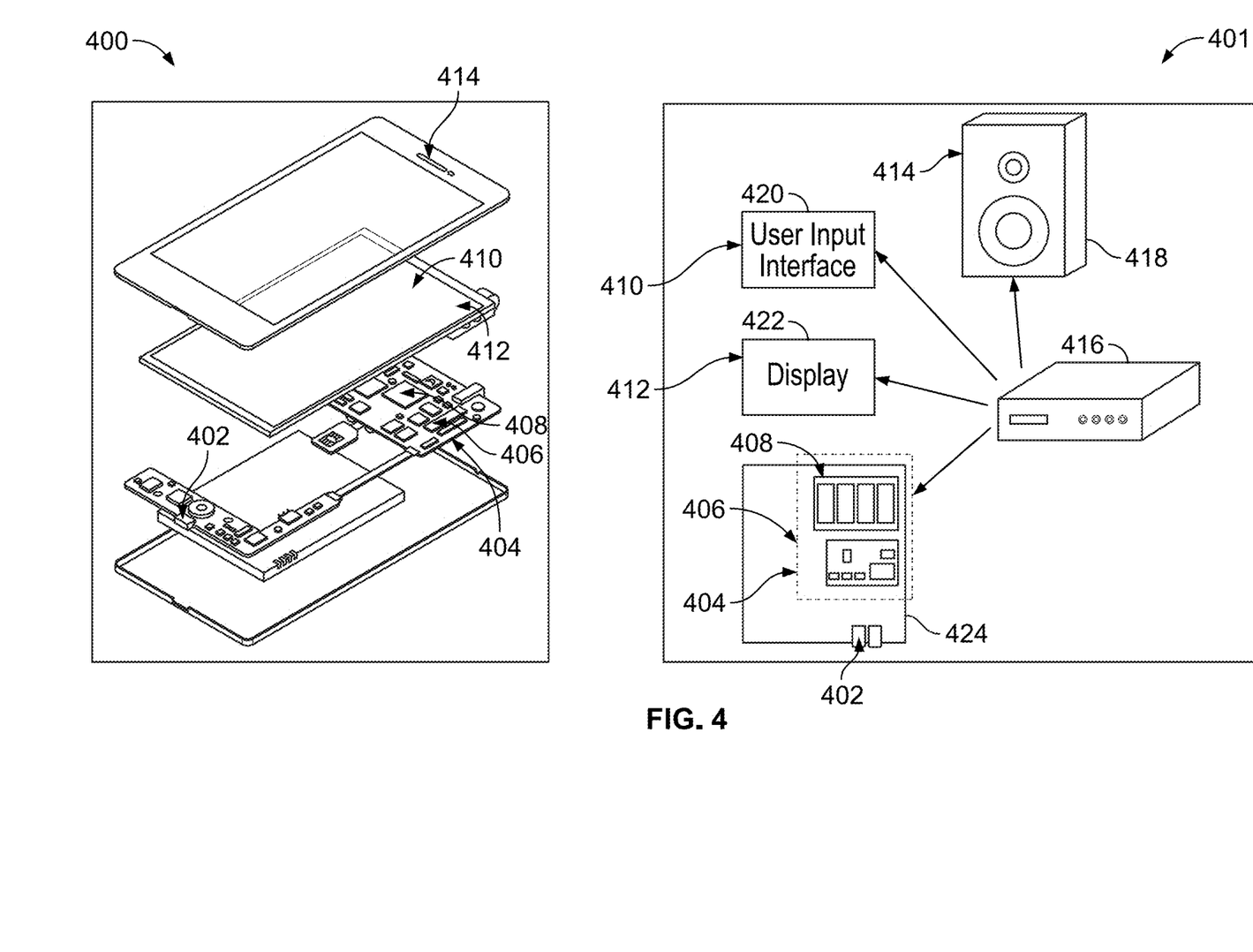
FIG. 4 is a block diagram of an illustrative user equipment (UE) device, in accordance with some embodiments of the disclosure.
Figure 5:
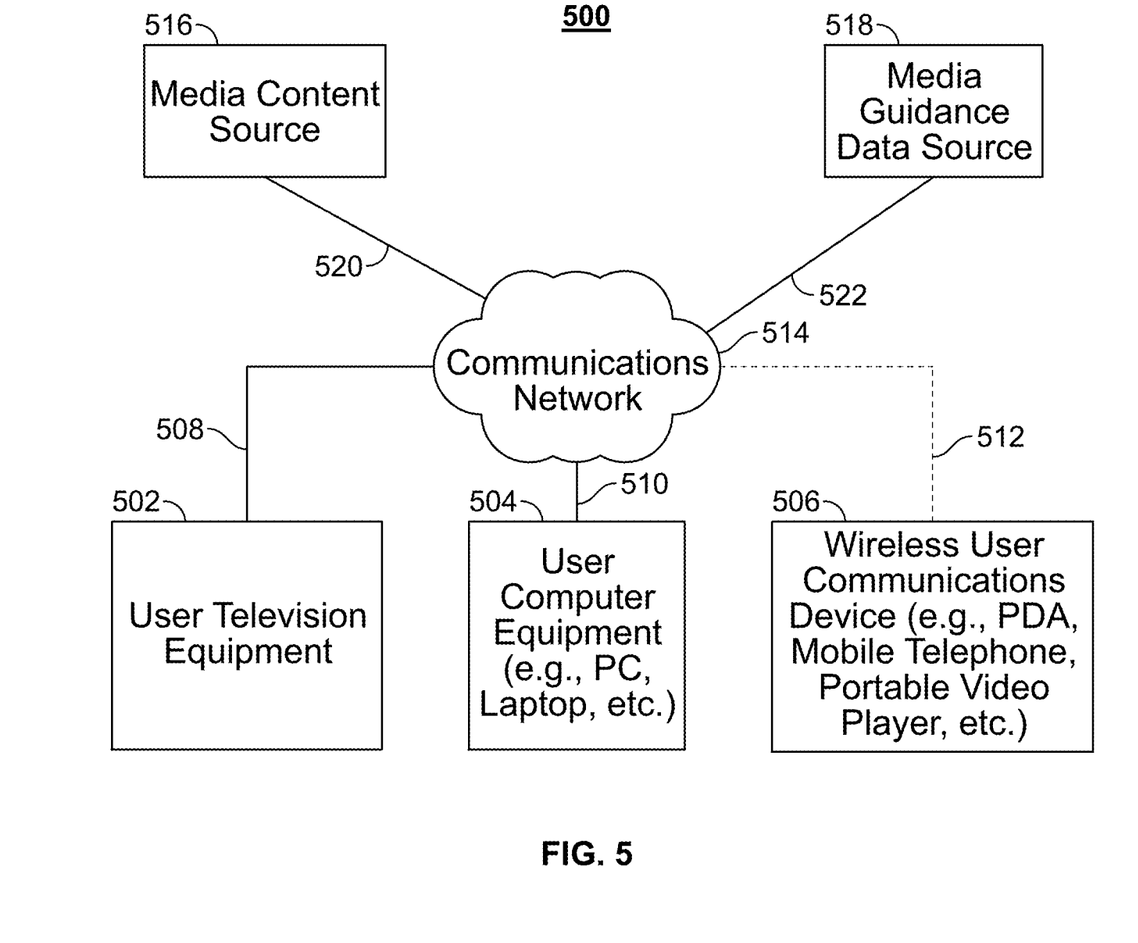
FIG. 5 is a block diagram of an illustrative media system, in accordance with some embodiments of the disclosure.

FIGS. 4-5 describe exemplary devices, systems, servers, and related hardware for analyzing use of catchphrases in conversation to perform searches and recommendations in accordance with the present disclosure. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, a user interface in accordance with the present disclosure may be available on these devices, as well. The user interface may be for content available only through a television, for content available only through one or more of other types of user equipment devices, or for content available both through a television and one or more of the other types of user equipment devices. The user interfaces described herein may be provided as online applications (i.e., provided on a web-site), or as stand-alone applications or clients on user equipment devices. Various devices and platforms that may implement the present disclosure are described in more detail below.

The devices and systems described herein may allow a user to provide user profile information or may automatically compile user profile information, including but not limited to user profile information relating to a user's conversational usage of catchphrases as described herein. For example, a user may provide permission to analyze conversations (e.g., for the limited use of identifying catchphrases or other information directly relevant to providing search and media asset recommendations) in applications such as text messaging, social media, gaming, media guidance, personal assistants, voice conferencing, video conferencing, and other similar applications. An application may, for example, monitor the content the user accesses and/or other interactions the user may have with the system and media assets provided through the system. Additionally, the application may obtain all or part of other user profiles that are related to a particular user (e.g., from other websites on the Internet the user accesses, such as www.Tivo.com, from other applications the user accesses, from other interactive applications the user accesses, from another user equipment device of the user, etc.), and/or obtain information about the user from other sources that the application may access. As a result, a user can be provided with a unified experience across the user's different user equipment devices. Additional personalized application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Users may access content and applications from one or more of their user equipment devices. FIG. 4 shows generalized embodiments of illustrative user equipment device 400 and illustrative user equipment system 401. For example, user equipment device 400 can be a smartphone device. In another example, user equipment system 401 can be a user television equipment system. In another example, user equipment system 401 may be in-vehicle entertainment system and/or vehicle control system. User equipment system 401 may comprise a set top box 416. Set top box 416 may be communicatively connected to speaker 418 and display 422. In some embodiments, display 422 may be a television display or a computer display. In some embodiments, set top box 416 may be communicatively connected to user interface input 420. In some embodiments, user interface input 420 may be a remote control device. Set top box 416 may include circuit board 424. In some embodiments, circuit board 424 may include processing circuitry, control circuitry, and storage (e.g., RAM, ROM, Hard Disk, Removable Disk, etc.). In some embodiments, circuit board 424 may include an input/output path. Additional implementations of user equipment devices are discussed below in connection with FIG. 5. Each one of user equipment device 400 and user equipment system 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communication paths (described below). I/O functions may be provided by one or more of these communication paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (i.e., storage 408). Specifically, control circuitry 404 may be instructed by applications to perform the functions discussed above and below. For example, applications may provide instructions to control circuitry 404 to generate displays. In some implementations, any action performed by control circuitry 404 may be based on instructions received from the applications.

In client/server-based embodiments, control circuitry 404 may include communications circuitry suitable for communicating with an application server or other networks or servers. The instructions for carrying out the above-mentioned functionality may be stored on the application server. Communications circuitry may include a cable modem, an integrated services digital network (ISDN) modem, a digital subscriber line (DSL) modem, telephone modem, Ethernet card, or wireless modem for communications with other equipment, or any other suitable communications circuitry. Such communications may involve the Internet or any other suitable communications networks or paths (which are described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of each one of user equipment device 400 and user equipment system 401. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from each one of user equipment device 400 and user equipment system 401, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, microphone, voice recognition interface, or other user input interfaces. Display 412 may be provided as a stand-alone device or integrated with other elements of each one of user equipment device 400 and user equipment system 401. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of each one of user equipment device 400 and user equipment system 401 or may be stand-alone units. The audio component of videos and other content displayed on display 412 may be played through speakers 414. In some embodiments, the audio may be distributed to a receiver (not shown), which processes and outputs the audio via speakers 414.

Applications may be implemented using any suitable architecture. For example, they may be stand-alone applications wholly implemented on each one of user equipment device 400 and user equipment system 401. In such an approach, instructions of the applications are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the application is a client/server-based application. Data for use by a thick or thin client implemented on each one of user equipment device 400 and user equipment system 401 is retrieved on demand by issuing requests to a server remote to each one of the user equipment device 400 and the user equipment system 401. In one example of a client/server-based application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on each one of equipment device 400 and equipment system 401. This way, the processing of the instructions is performed remotely by the server while the resulting displays are provided locally on each one of equipment device 400 and equipment system 401. Each one of equipment device 400 and equipment system 401 may receive inputs from the user via input interface 410 and transmit those inputs to the remote server for processing and generating the corresponding displays. For example, each one of equipment device 400 and equipment system 401 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to each one of equipment device 400 and equipment system 401 for presentation to the user.

In some embodiments, the application is downloaded and interpreted or otherwise run by an interpreter or virtual machine (run by control circuitry 404). In some embodiments, the application may be encoded in the ETV Binary Interchange Format (EBIF), received by control circuitry 404 as part of a suitable feed, and interpreted by a user agent running on control circuitry 404. For example, the application may be an EBIF application. In some embodiments, the application may be defined by a series of JAVA-based files that are received and run by a local virtual machine or other suitable middleware executed by control circuitry 404. In some of such embodiments (e.g., those employing MPEG-2 or other digital media encoding schemes), the application may be, for example, encoded and transmitted in an MPEG-2 object carousel with the MPEG audio and video packets of a program.

Each one of user equipment device 400 and user equipment system 401 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which an application may be implemented, may function as stand-alone devices or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or wireless user communications device 506. For example, user television equipment 502 may, like some user computer equipment 504, be Internet-enabled, allowing for access to Internet content, while user computer equipment 504 may, like some television equipment 502, include a tuner allowing for access to television programming. Applications may have the same layout on various different types of user equipment or may be tailored to the display capabilities of the user equipment. For example, on user computer equipment 504, applications may be provided as a website accessed by a web browser. In another example, applications may be scaled down for wireless user communications devices 506.

In system 500, there are typically more than one of each type of user equipment device, but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device. In some embodiments, speech may be monitored from any of the user equipment devices and communicated between the devices for processing as described herein.

The user may also set various settings to maintain consistent application settings across in-home devices and remote devices. Settings include those described herein, as well as channel and program favorites, programming preferences that the application utilizes to make programming recommendations, display preferences, and other desirable guidance settings such as settings related to use of conversational speech to assist in providing better searches and recommendations. For example, a user may maintain a variety of settings related to a search and recommendation preferences, such as applications for use in seeding search and recommendation results, rankings for catchphrases, and preferences related to catchphrase related search and recommendation such as associations with genres, actors, characters, etc. Changes made on one user equipment device can change the guidance experience on another user equipment device, regardless of whether they are the same or a different type of user equipment device. In addition, the changes made may be based on settings input by a user, as well as user activity monitored by applications.

The user equipment devices may be coupled to communications network 514. Namely, user television equipment 502, user computer equipment 504, and wireless user communications device 506 are coupled to communications network 514 via communication paths 508, 510, and 512, respectively. Communications network 514 may be one or more networks including the Internet, a mobile phone network, mobile voice or data network (e.g., a 4G or LTE network), cable network, public switched telephone network, or other types of communications networks or combinations of communications networks. Paths 508, 510, and 512 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Path 512 is drawn with dotted lines to indicate that in the exemplary embodiment shown in FIG. 5 it is a wireless path, and paths 508 and 510 are drawn as solid lines to indicate they are wired paths (although these paths may be wireless paths, if desired). Communications with the user equipment devices may be provided by one or more of these communication paths, but are shown as single paths in FIG. 5 to avoid overcomplicating the drawing.

Although communication paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes media content source 516 and media guidance data source 518 coupled to communications network 514 via communication paths 520 and 522, respectively. Paths 520 and 522 may include any of the communication paths described above in connection with paths 508, 510, and 512. Communications with content source 516 and data source 518 may be exchanged over one or more communication paths, but are shown as single paths in FIG. 5 to avoid overcomplicating the drawing. In addition, there may be more than one of each of content source 516 and data source 518, but only one of each is shown in FIG. 5 to avoid overcomplicating the drawing. (The different types of each of these sources are discussed below.) If desired, content source 516 and data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Data source 518 may provide storage and/or professing of catchphrase related information, such as databases and data structures providing a history of user catchphrase usage, relations to catchphrase usage by other conversation participants, and associations between catchphrases, media assets, and other related information such as characters, genres, actors, and keywords. In some embodiments, catchphrase related data from data source 518 may be provided to users' equipment using a client-server approach. For example, a user equipment device may pull data from a server, or a server may push data to a user equipment device. In some embodiments, an application client residing on the user's equipment may initiate sessions with data source 518 to obtain catchphrase data when needed, e.g., when a user takes action or provides speech that initiates a conversation to monitor for catchphrases or requests information relating to media assets. Communication between data source 518 and the user equipment may be provided with any suitable frequency (e.g., continuously, daily, a user-specified period of time, a system-specified period of time, in response to a request from user equipment, etc.).

In some embodiments, data received by data source 518 may include viewer data that may be used as training data. For example, the viewer data may include current and/or historical user activity information related to portions of media assets and related user speech. In some embodiments, the user activity information may include data from a second device, such as speech from a user or other users. The data may also include selections prompted by the application, such as identification of conversations including catchphrases.

Applications may be, for example, stand-alone applications implemented on user equipment devices. For example, the application may be implemented as software or a set of executable instructions which may be stored in storage 408 and executed by control circuitry 404 of each one of a user equipment device 400 and 401. In some embodiments, applications may be client-server applications where only a client application resides on the user equipment device, and the server application resides on a remote server. For example, applications may be implemented partially as a client application on control circuitry 404 of each one of user equipment device 400 and user equipment system 401 and partially on a remote server as a server application (e.g., data source 518) running on control circuitry of the remote server. When executed by control circuitry of the remote server (such as data source 518), the server application may instruct the control circuitry to generate the application displays and transmit the generated displays to the user equipment devices. The server application may instruct the control circuitry of data source 518 to transmit data for storage on the user equipment. The client application may instruct control circuitry of the receiving user equipment to generate the application displays.

Content and/or data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide data described above. In addition to content and/or data, providers of OTT content can distribute applications (e.g., web-based applications or cloud-based applications), or the content can be displayed by applications stored on the user equipment device.

Figure 6:
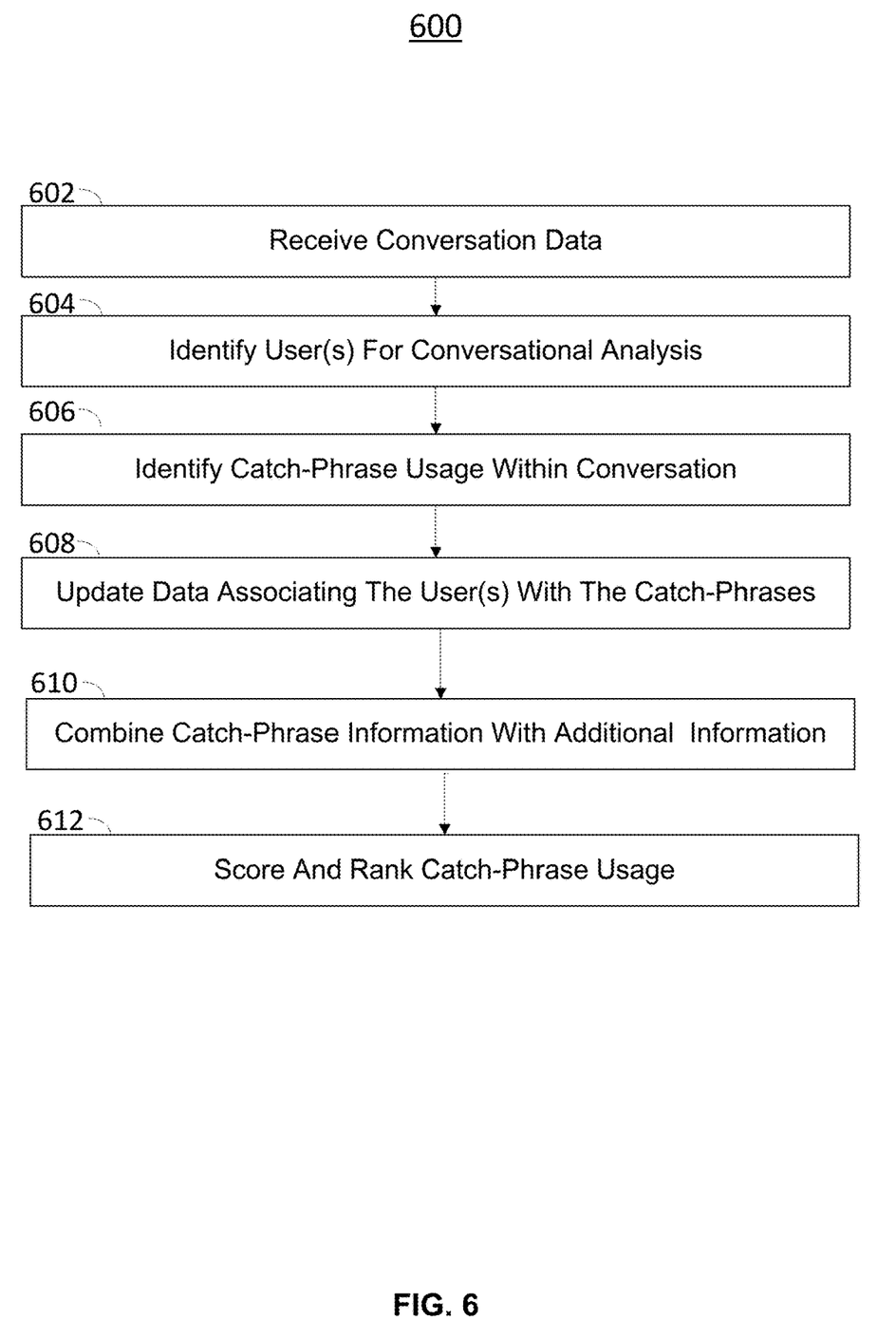
FIG. 6 is a flowchart of a process for processing catchphrases in conversation in accordance with some embodiments of the present disclosure.
Figure 7:
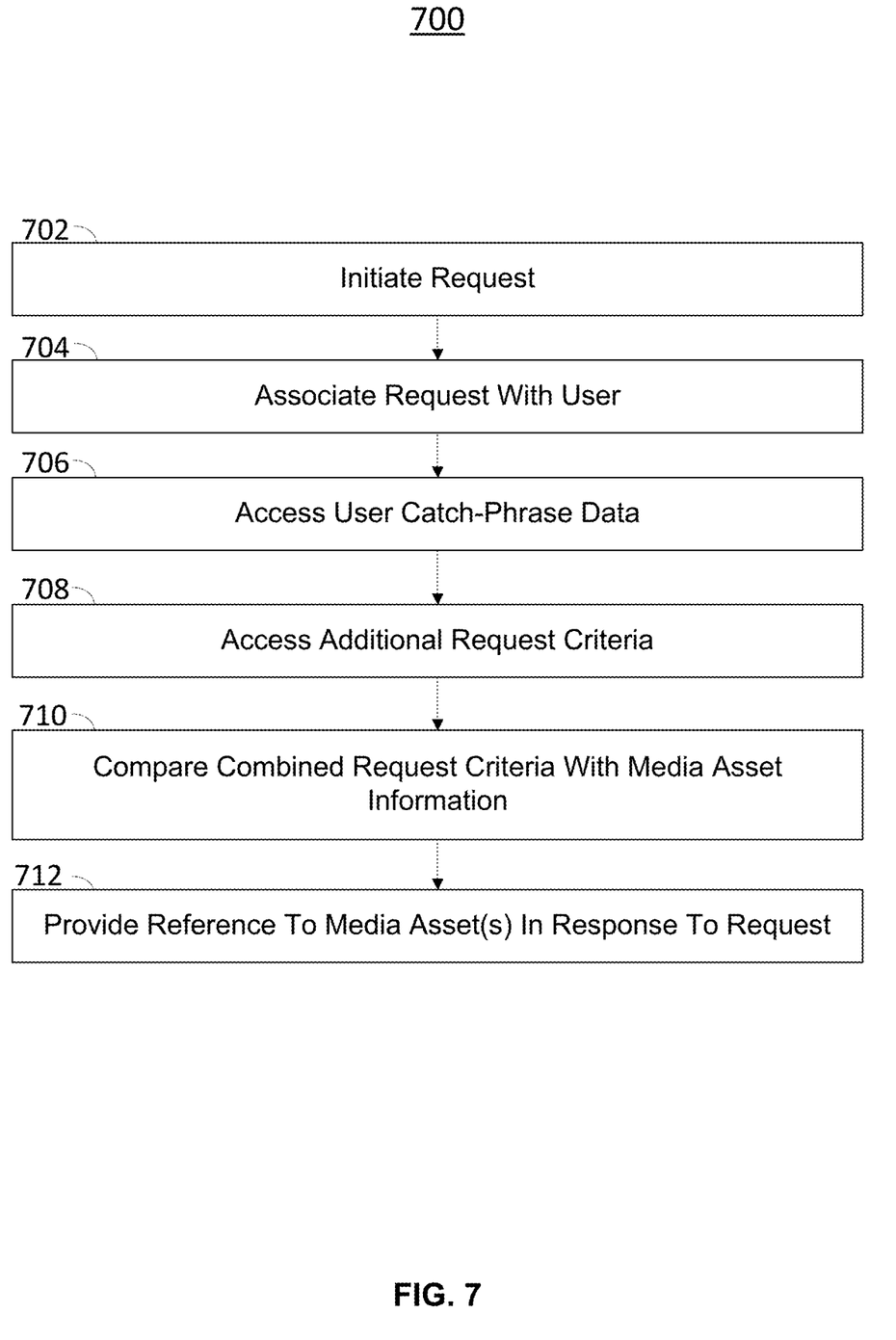
FIG. 7 is a flowchart of a process for performing a media asset search based on a user's conversational use of catchphrases, in accordance with some embodiments of the disclosure.

FIGS. 6-8 are flowcharts relating to media asset search and recommendation based on conversational use of catchphrases in accordance with some embodiments of the disclosure. The processes of FIGS. 6-8 may be executed by any of control circuitry (e.g., control circuitry 404) any computing equipment and devices described herein, such as different types of user equipment, content sources, and data sources as described herein. Although particular steps of these methods may be described herein as being performed by particular equipment or devices, it will be understood that the steps of the processes depicted and described in FIGS. 6-8 or aspects of the steps therein may be performed on different computing equipment and devices and data exchanged over communications networks as described herein.

FIG. 6 is a flowchart of a process for processing catchphrases in conversation in accordance with some embodiments of the present disclosure. As described herein, the steps of FIG. 6 may be performed by a media guidance system, which may comprise a single device and application or multiple devices and/or applications working in concert.

At step 602, conversation data may be received by an application and/or device, for example, by a personal assistant or messaging application operating on a mobile device. The messages may be processed in real time, saved for later processing, and/or transmitted to another program or device for further processing. In some embodiments, the received conversation may be processed for accuracy and clarity, for example, by performing spell-checking of text conversations or performing natural language processing for spoken conversations.

At step 604, the conversation data may be analyzed to identify users, such as by association with a username (e.g., for a text messaging application) or by voice recognition (e.g., for a conversation received as audio). The user identification may be used to identify portions of the conversation for performing analysis, based on user opt-ins and settings as described herein. In this manner, only the appropriate conversational data may be analyzed.

At step 606, the usage of catchphrases may be determined from the portion of the conversation. In some embodiments, the language of the conversation may be compared to known catchphrases, such as from a catchphrase data structure and/or a data structure associating catchphrases with a user. In some embodiments, catchphrases for comparison with conversations may be identified based on a level of uniqueness of the word, phrase, or tone in a media assets. Consistency of usage may also be considered as indicative of likely status of a catchphrase, both within the user's conversation and in media assets. Once the catchphrase usage from the conversation has been identified, in some embodiments the remainder of the conversation data may be deleted.

At step 608, one or more data structures may be updated based on the user's catchphrase usage, such as a catchphrase data structure and/or a user profile data structure. The data structure or data structures may be updated in a variety of manners, such as by incrementing a count of catchphrase usage or storing a log of each instance of catchphrase usage (e.g., by timestamp). Additional information about the particular usage of the catchphrase (e.g., time, location, other participants, and conversation identifier) may be also be stored with the indicator of catchphrase usage.

At step 610, additional information that is not directly associated with the instance of catchphrase usage may be acquired and stored with catchphrase information as described herein. In an exemplary embodiment, information may be obtained from a variety of sources to provide context for the instance of catchphrase usage, such as recent history of media asset viewing, contacts and interactions with third parties, recent events, social media and news trends, and other similar information that may be related to the user's choice of a particular catchphrase for a conversation.

At step 612, scores and/or rankings associated with catchphrases may be updated based on the recently acquired catchphrase information. In some embodiments, each catchphrase may have a score and/or ranking that is indicative of the relevance of the catchphrase to recommendations or search results for the user. The score and/or ranking may be based on a variety of factors such as frequency of usage, recency of usage, usage patterns, and other similar factors. The scores and/or rankings may then be stored for later usage in providing recommendations or search results to users.

FIG. 7 is a flowchart of a process for performing a media asset search based on a user's conversational use of catchphrases, in accordance with some embodiments of the disclosure. At step 702, a request to provide a recommendation or perform a search may be initiated. In some embodiments, the request may be initiated without a direct user request, such as when a user walks into a room with a television screen at a time of day when the user normally watches media assets. In some embodiments, the user may take an action to initiate the request, such as clicking a "recommendations" button, opening a media guidance application, or entering a search string. The request may be parsed as necessary (e.g., to identify commands and search strings) for further processing.

At step 704, the request may be associated with a user, such that user-specific catchphrase data can be accessed. Although the request may be associated with a user in a variety of suitable manners, in exemplary embodiments the user may be identified based on a login, location information, or voice recognition. At step 706, catchphrase data for the user may be accessed, including catchphrase scores, rankings, history, and associated information as described herein. At step 708, additional request criteria may be accessed, such as commands, the content of search queries, and other information relating to the request, such as time of day, location, weather, user activity, recent viewing history, and other users in the area of the display device.

At step 710, the combined request criteria may be compared to information about media assets to identify a recommendation or search result that is based on catchphrase usage but does not include the catchphrase. In some embodiments, catchphrases for use in identifying media assets can be selected at least in part based on the additional request information, for example, based on catchphrase keywords and genres that correspond to the additional request information (e.g., genres or keywords that correspond to the weather and the user's recent activities). Once catchphrases are selected for use in comparison to media asset information, common information from the selected catchphrases may be used to identify criteria for selecting media assets for responding to the request. Media assets may be selected and ranked based on correspondence to the common information from the selected catchphrases (e.g., based on overlap of common information and catchphrase score or ranking) Once the media asset or media assets are selected, at step 712 a reference to the media asset (e.g., a media asset identifier) may be provided to an application and/or user device to be provided in a response to the user.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    identifying a first portion of a conversation;
    comparing the first portion of the conversation to a database of unique catchphrases, wherein each unique catchphrase in the database of unique catchphrases is associated with at least one media asset and is a linguistic usage uniquely identified with an individual who appears in media assets;
    determining, based on the comparison, the first portion of the conversation comprises a unique catchphrase in the database of the unique catchphrases;
    retrieving information corresponding to at least one media asset with which the unique catchphrase is associated;
    identifying, based on the retrieved information, a related media asset that does not include the unique catchphrase and is not the at least one media asset associated with the identified unique catchphrase; and
    providing a media asset recommendation comprising the related media asset.

2. The method of claim 1, wherein the conversation corresponds to a conversation captured by a passive listening device.

3. The method of claim 1, wherein the conversation corresponds to a conversation on a messaging platform.

4. The method of claim 1, wherein the retrieved information comprises one or more of an actor, a character, a genre, or a keyword.

5. The method of claim 4, wherein the retrieved information is retrieved from one or more of metadata of the media asset, a database of media assets, the database of unique catch phrases, memory corresponding to a messaging platform, or memory corresponding to a content delivery platform.

6. The method of claim 1, further comprising:
    identifying a user profile of a participant in the conversation;
    identifying a plurality of media assets based on the user profile; and
    selecting the related media asset from the plurality of media assets identified based on the user profile.

7. The method of claim 1, further comprising:
    identifying a user profile of a participant in the conversation;
    identifying a plurality of media assets based on a viewing history associated with the user profile; and
    selecting the related media asset from the plurality of media assets identified based on the viewing history.

8. The method of claim 1, wherein identifying the related media asset based on the retrieved information comprises:
    accessing a plurality of previous unique catchphrases that a participant in the conversation has previously used in previous conversations;
    identifying previous media asset information associated with the previous unique catchphrases;
    identifying information from the determined unique catchphrase that matches previous media asset information corresponding to the at least one media asset; and
    identifying the related media asset based on the common information.

9. The method of claim 1, further comprising:
    identifying a plurality of media assets that include the determined unique catchphrase; and
    increasing a recommendation priority for the plurality of media assets.

10. The method of claim 1, further comprising:
    identifying a second portion of the conversation;
    comparing the second portion of the conversation to the database of unique catchphrases;
    determining, based on the comparison, the second portion of the conversation comprises a second catchphrase in the database of the unique catchphrases;
    retrieving information corresponding to at least one media asset with which the second catchphrase is associated;
    identifying a second related media asset based on the retrieved information; and
    providing a second media asset recommendation comprising the second related media asset along with the media asset recommendation comprising the related media asset.

11. A system comprising:
    a communication port;
    a memory storing instructions; and
    control circuitry communicably coupled to the memory and the communication port and configured to execute the instructions to:
    identify a first portion of a conversation;
    compare the first portion of the conversation to a database of unique catchphrases, wherein each unique catchphrase in the database of unique catchphrases is associated with at least one media asset and is a linguistic usage uniquely identified with an individual who appears in media assets;
    determine, based on the comparison, the first portion of the conversation comprises a unique catchphrase in the database of the unique catchphrases;
    retrieve information corresponding to at least one media asset with which the unique catchphrase is associated;
    identify, based on the retrieved information, a related media asset does not include the unique catchphrase and is not the at least one media asset associated with the identified unique catchphrase; and
    provide a media asset recommendation comprising the related media asset.

12. The system of claim 11, wherein the control circuitry is further configured to capture the conversation by a passive listening device.

13. The system of claim 11, wherein the control circuitry is further configured to receive the conversation on a messaging platform.

14. The system of claim 11, wherein the control circuitry is further configured to retrieve information that comprises one or more of an actor, a character, a genre, or a keyword.

15. The system of claim 14, wherein the control circuitry configured to retrieve information is further configured to retrieve information from one or more of metadata of the media asset, a database of media assets, the database of unique catch phrases, memory corresponding to a messaging platform, or memory corresponding to a content delivery platform.

16. The system of claim 11, wherein the control circuitry is further configured to:
identify a user profile of a participant in the conversation;
identify a plurality of media assets based on the user profile; and
select the related media asset from the plurality of media assets identified based on the user profile.

17. The system of claim 11, wherein the control circuitry is further configured to:
identify a user profile of a participant in the conversation;
identify a plurality of media assets based on a viewing history associated with the user profile; and
select the related media asset from the plurality of media assets identified based on the viewing history.

18. The system of claim 11, wherein the control circuitry configured to identify the related media asset based on the retrieved information is further configured to:
access a plurality of previous unique catchphrases that a participant in the conversation has previously used in previous conversations;
identify previous media asset information associated with the previous unique catchphrases;
identify information from the determined unique catchphrase that matches previous media asset information corresponding to the at least one media asset; and
identify the related media asset based on the common information.

19. The system of claim 11, wherein the control circuitry is further configured to:
identify a plurality of media assets that include the determined unique catchphrase; and
increase a recommendation priority for the plurality of media assets.

20. The system of claim 11, wherein the control circuitry is further configured to:
identify a second portion of the conversation;
compare the second portion of the conversation to the database of unique catchphrases;
determine, based on the comparison, the second portion of the conversation comprises a second catchphrase in the database of the unique catchphrases;
retrieve information corresponding to at least one media asset with which the second catchphrase is associated;
identify a second related media asset based on the retrieved information; and
provide a second media asset recommendation comprising the second related media asset along with the media asset recommendation comprising the related media asset.

* * * * *